United States Patent
Hiernaux (10) Patent No.: US 9,970,301 B2
(45) Date of Patent: May 15, 2018

(54) BLADE WITH BRANCHES FOR AN AXIAL-FLOW TURBOMACHINE COMPRESSOR

(71) Applicant: Techspace Aero S.A., Herstal (Milmort) (BE)

(72) Inventor: Stephane Hiernaux, Oupeye (BE)

(73) Assignee: Safran Aero Boosters SA (BE)

( * ) Notice: Subject to any disclaimer, the term of this patent is extended or adjusted under 35 U.S.C. 154(b) by 303 days.

(21) Appl. No.: 14/803,798

(22) Filed: Jul. 20, 2015

(65) Prior Publication Data
US 2016/0024931 A1 Jan. 28, 2016

(30) Foreign Application Priority Data
Jul. 22, 2014 (EP) .................................. 14177988

(51) Int. Cl.
*F01D 5/14* (2006.01)
*F01D 9/04* (2006.01)

(52) U.S. Cl.
CPC ............ *F01D 5/146* (2013.01); *F01D 9/041* (2013.01); *F05D 2230/20* (2013.01); *F05D 2230/30* (2013.01); *F05D 2240/30* (2013.01)

(58) Field of Classification Search
CPC ........... F01D 5/141; F01D 5/146; F01D 9/041
USPC .............................................. 416/235, 227 R
See application file for complete search history.

(56) References Cited

U.S. PATENT DOCUMENTS

| 2,576,700 | A | | 11/1951 | Schneider |
| 2,938,662 | A | | 5/1960 | Eckert et al. |
| 4,687,416 | A | | 8/1987 | Spranger |
| 6,142,739 | A | * | 11/2000 | Harvey .................... F01D 5/20 415/173.1 |

(Continued)

FOREIGN PATENT DOCUMENTS

| DE | 3708159 A1 | 9/1988 |
| FR | 2914943 A1 | 10/2008 |

(Continued)

OTHER PUBLICATIONS

WO 2005/040559, full text, annotated.*
European Search Report from corresponding European Application No. EP14177988.4, dated Sep. 9, 2014.

*Primary Examiner* — Ninh H Nguyen
*Assistant Examiner* — Topaz L Elliott
(74) *Attorney, Agent, or Firm* — Sandberg Phoenix & von Gontard PC (57) ABSTRACT

A blade of a compressor or of an axial-flow turbomachine. The blade comprises a joining airfoil, or main airfoil, extended by branches, or auxiliary branch airfoils. The branches are adjacent and extend the joining airfoil radially. The branches form a row over the circumference and comprise faces facing one another. The branches comprise joining edges connected to the joining airfoil and are coincident or joined so as to form a circumferential material continuation between the adjacent branches. The leading edges and the trailing edges of the branches are a continuation of the leading edges and the trailing edges of the joining airfoil. The branch airfoils offer more anchoring points for a blade. The overlap of the branch airfoils strengthens the edges of the joining airfoil, which can thus be formed thinner. The blade comprises a fixing platform connected to the branch airfoils.

18 Claims, 4 Drawing Sheets

(56) References Cited

U.S. PATENT DOCUMENTS

| | | | |
|---|---|---|---|
| 6,863,497 B2* | 3/2005 | Seydel | F01D 5/225 |
| | | | 415/189 |
| 7,396,208 B1 | 7/2008 | Hussain | |
| 8,133,032 B2* | 3/2012 | Tibbott | F01D 5/20 |
| | | | 416/235 |
| 8,257,023 B2* | 9/2012 | Belmonte | F01D 5/146 |
| | | | 415/83 |
| 2014/0119920 A1* | 5/2014 | Coull | F01D 5/20 |
| | | | 416/182 |
| 2014/0314556 A1* | 10/2014 | Fremont | B29C 70/222 |
| | | | 415/200 |

FOREIGN PATENT DOCUMENTS

| | | |
|---|---|---|
| GB | 1518873 A | 7/1978 |
| GB | 2106193 A | 4/1983 |
| WO | 2005040559 A1 | 5/2005 |

* cited by examiner

BLADE WITH BRANCHES FOR AN AXIAL-FLOW TURBOMACHINE COMPRESSOR

CROSS-REFERENCE TO RELATED APPLICATIONS

This application claims the benefit, under 35 U.S.C. § 119, of EP 14177988.4, filed Jul. 22, 2014, the disclosure of which is incorporated herein by reference in its entirety.

FIELD

The invention relates to a turbomachine blade. The invention also relates to a blading with a row of branched blades. The invention also relates to a turbomachine comprising a blade having branches and/or a blading with a row of branched blades.

BACKGROUND

An axial-flow turbomachine blade generally has a profiled airfoil extending in the flow of the turbomachine. To reduce the number of blades in a row whilst maintaining performance, it is known to provide a blade with branches.

Document FR 2 914 943 A1 discloses a fan blade of an axial-flow turbomachine. The blade comprises a first portion extending from a fan means, and a plurality of other portions extending the first portion radially outwardly. All of these portions are connected by a platform disposed at the outer end of the first portion. However, this blade design has reduced rigidity. The presence of the platform in the middle of the fluid stream may disturb the flow. During operation, the branches are subjected to vibrations and forces that may damage the blade. The blade has a significant mass. The presence of the branches stresses the platform; the mechanical strength of the platform means it has to be made thicker, which disturbs the flow.

SUMMARY

One object of the invention is to overcome at least one of the problems posed by the prior art. More precisely, an object of the invention is to increase the rigidity of a turbomachine blade with branches. A further object of the invention is to make rigid a turbomachine blading with branched blades. Another object of the invention is to protect the turbomachine in the event of ingestion.

The invention relates to a blade of a turbomachine comprising: a joining airfoil intended to extend over its height H1 through a flow of the turbomachine, at least two branch airfoils, which are connected to the joining airfoil, extending the joining airfoil over the height H1 thereof, noteworthy in that the at least two branch airfoils comprise joining edges at least partially coincident so as to join the branch airfoils to one another along the joining airfoil.

In accordance with various advantageous embodiments of the invention the joining edges of the branch airfoils are joined over the majority, for example, over all of their lengths L and/or of the length of the chord of the joining airfoil.

In accordance with various advantageous embodiments of the invention the blade comprises a support connected to the branch airfoils on the side opposite the joining airfoil, and/or a support connected to the joining airfoil on the side opposite the branch airfoils, at least one support can be a fixing platform and comprising a fixing means.

In accordance with various advantageous embodiments of the invention the airfoils comprise leading edges and trailing edges, the leading edge of the joining airfoil being extended radially by the leading edges of the branch airfoils, and/or the trailing edge of the joining airfoil being extended radially by the trailing edges of the branch airfoils, the leading edges and the trailing edges of the branch airfoils can be tangential to the leading edge and the trailing edge of the joining airfoil respectively.

In accordance with various advantageous embodiments of the invention the branch airfoils form a thickened portion in the blade compared with the joining airfoil, each airfoil can have an intrados surface and an extrados surface, the joining edges being delimited by the intrados surface and by the extrados surface of the joining airfoil.

In accordance with various advantageous embodiments of the invention each airfoil comprises a radial stack of aerodynamic profiles, the stacks of profiles of the branch airfoils diverging from the stack of profiles of the joining airfoil such that at least one profile of the branch airfoil is at a distance from at least one profile of the joining airfoil measured in the plane of the profile of the joining airfoil.

In accordance with various advantageous embodiments of the invention the mean thickness of the aerodynamic profiles of the branch airfoils is less than the mean thickness of the profiles of the joining airfoil.

In accordance with various advantageous embodiments of the invention the branch airfoils delimit, therebetween, a space passing through the blade along the chord of the joining airfoil, the space can be in the extension of the height H1 of the joining airfoil.

In accordance with various advantageous embodiments of the invention, each airfoil comprises an intrados surface and an extrados surface, the intrados surface and/or the extrados surface of the joining airfoil being tangential to the intrados surface of a branch airfoil and/or to the extrados surface of a branch airfoil.

In accordance with various advantageous embodiments of the invention, the at least two branch airfoils have faces facing one another, the at least two branch airfoils can form a circumferential row.

In accordance with various advantageous embodiments of the invention at least one or each branch airfoil is generally inclined relative to the joining airfoil, at least one or each branch airfoil can have an inversion of curvature radially in relation to the joining airfoil.

In accordance with various advantageous embodiments of the invention, each branch airfoil or a plurality of the branch airfoils comprises/comprise aerodynamic profiles cambered in the same direction, the profiles having spacings that are generally constant along the joining airfoil so as to support a flow in the turbomachine.

In accordance with various advantageous embodiments of the invention the branch airfoils have generally parallel chords at least at one given height so as to guide a flow in the turbomachine.

In accordance with various advantageous embodiments of the invention the branch airfoils and the joining airfoil are integral and are made by powder-based, e.g., metal powder-based, additive manufacturing.

In accordance with various advantageous embodiments of the invention the branch airfoils have the same heights, e.g., radial heights, and/or the same lengths, e.g., axial lengths.

In accordance with various advantageous embodiments of the invention the blade comprises a fixing means, the branch airfoils extending over their height H2 between the fixing means and the joining airfoil, or the airfoil extending over its height H1 between the fixing means and the branch airfoils.

In accordance with various advantageous embodiments of the invention at least one branch, or the majority of branches, or each branch forms an inversion of curvature in relation to the airfoil of the blade.

In accordance with various advantageous embodiments of the invention at least one branch airfoil, or the majority of branch airfoils, or each branch airfoil has/have a radial height less than the joining airfoil.

In accordance with various advantageous embodiments of the invention the blade is a stator vane or a rotor blade.

In accordance with various advantageous embodiments of the invention at least one or each branch airfoil has a height H2 greater than 5%, e.g., greater than 10%, e.g., greater than 20% of the height H1 of the joining airfoil.

In accordance with various advantageous embodiments of the invention the blade is a compressor blade, for example, a low-pressure compressor blade, or a turbine blade, or a fan blade.

In accordance with various advantageous embodiments of the invention the length of the chord of the joining airfoil is greater than or equal to the chord of each branch airfoil.

In accordance with various advantageous embodiments of the invention the branch airfoils, from the joining airfoil, converge towards one another along their height H2 and their length L.

In accordance with various advantageous embodiments of the invention the joining edges overlap axially so as to form an axial contact.

In accordance with various advantageous embodiments of the invention the joining edges are anchored on one another or to one another.

In accordance with various advantageous embodiments of the invention the faces of the branch airfoils facing one another match one another at the joining airfoil.

In accordance with various advantageous embodiments of the invention the joining airfoil comprises an aerodynamic profile that brings together the branch airfoils.

In accordance with various advantageous embodiments of the invention the joining airfoil is divided along its thickness into a plurality of branch airfoils.

In accordance with various advantageous embodiments of the invention the branch airfoils delimit the joining airfoil in the height direction thereof.

In accordance with various advantageous embodiments of the invention the mean space between two adjacent branch airfoils is greater than half the mean thickness, for example, greater than the mean thickness of the joining airfoil that is joined there.

In accordance with various advantageous embodiments of the invention the mean space between two adjacent branch airfoils is less than the mean chord, for example, less than half the mean chord of the joining airfoil that is joined there.

In accordance with various advantageous embodiments of the invention each branch airfoil, in the height direction thereof, comprises at least two portions that are generally inclined in relation to one another.

The invention also relates to a blading comprising blades, noteworthy in that the blades are formed in accordance with the various embodiments of the invention as described herein.

The invention also relates to an axial-flow turbomachine comprising at least one blade, noteworthy in that the at least one blade is formed in accordance with the invention. In various embodiments, the turbomachine comprises a compressor with rows of blades, at least one or each compressor blade being formed in accordance with the invention.

In accordance with various advantageous embodiments of the invention the blades form bladings according to the various embodiments described herein.

Each advantageous embodiment of the invention can apply to the other objects of the invention. Each object of the invention can be combined with the other objects of the invention.

As described herein, in various embodiments, the invention proposes a turbomachine blade, in particular a compressor turbomachine blade, comprising a plurality of auxiliary airfoils that are joined along a common joint, and a joining airfoil that extends the common joint along the height H1 of the joining airfoil.

The invention makes it possible to make the blade rigid. In fact, the branch airfoils form an angle at the end of the joining airfoil where the branch airfoils are joined. The edge of the joining airfoil is made rigid, the mechanical strength thereof no longer being dependent solely on the central part of the joining airfoil. As a result, the central part can be made thinner and further optimized. The aerodynamic gain and the strengthening make it possible to reduce the number of blades in a blade stage.

The invention makes it possible to strengthen the blading by forming joints between the adjacent lateral branches. The shroud or the shroud segment forms a bridge connecting the ends of the branches within the same blade, or connecting the ends of the branches of one blade to another adjacent blade. The branches are thus protected against vibrations, which could damage the branches.

The presence of branches between an airfoil and a shroud multiplies the anchoring points, the transmission zones and the distribution of forces. The joining of two adjacent blade branches also makes it possible to distribute forces in different blades. In addition, the formation of spacings in a row of connected branches makes it possible to optimize the flexibility, the rigidity and the transmission of forces in a blading.

The invention makes it possible to increase the number of airfoils that could intercept a body in the event of ingestion. The body can be slowed down and in some instances can be trapped or further divided thanks to the added leading edges. The ingested bodies thus tend to be reduced upstream, which makes it possible to protect the elements downstream. The positioning of branches at the end of the airfoil makes it possible to act effectively against the fragments in the vicinity of the walls of the fluid streams, which constitute locations where the fragments are frequently found due to flow dynamics and/or inclinations of the fluid streams.

The configuration in which the branches overlap axially makes it possible to form reinforcements making the airfoil rigid. The airfoil can thus be made thinner and lighter because it is less exposed to torsion. The profiles of the airfoil can be better adapted to the aerodynamic needs. This configuration strengthens the connections between the branches, which makes the branches more resistant to ingestions.

DETAILED DESCRIPTION

In the description below the terms internal or inner and external or outer relate to a positioning in relation to the axis of rotation of an axial-flow turbomachine.

Figure 1:
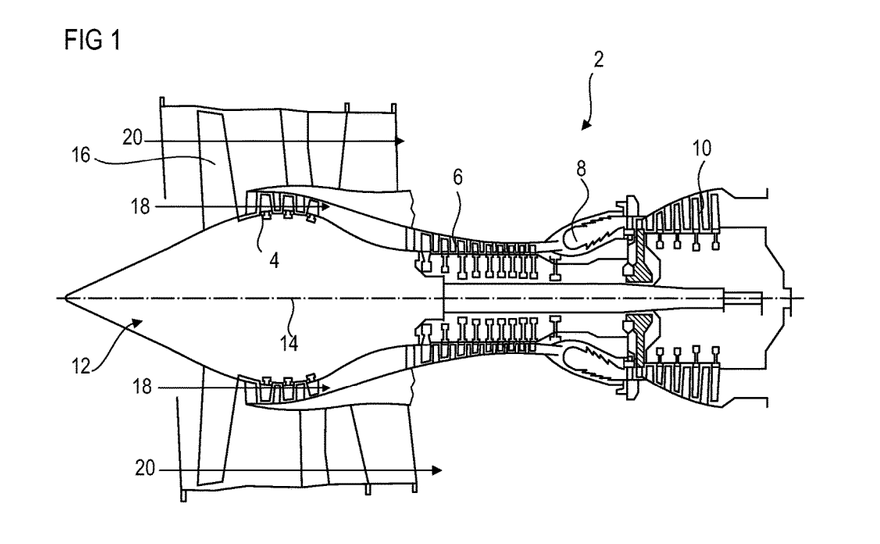
FIG. 1 shows an axial-flow turbomachine according to various embodiments of the invention.

FIG. 1 shows an axial-flow turbomachine in a simplified manner. In this specific case the axial-flow turbomachine is a bypass turbojet. The turbojet 2 comprises a first compression level, referred to as a low-pressure compressor 4, a second compression level, referred to as a high-pressure compressor 6, a combustion chamber 8, and one or more turbine levels 10. During operation the mechanical power of the turbine 10 transmitted via the central shaft to the rotor 12 sets in movement the two compressors 4 and 6. The different turbine stages can each be connected to compressor stages via concentric shafts. The shafts have a plurality of rows of rotor blades associated with rows of stator blades. The rotation of the rotor about the axis of rotation 14 thereof thus makes it possible to generate a flow of air and to progressively compress the flow of air as far as the inlet of the combustion chamber 8.

An inlet ventilator referred to commonly as a fan or blower 16 is coupled to the rotor 12 and generates a flow of air that is divided into a primary flow 18 passing through the different above-mentioned levels of the turbomachine 2 and a secondary flow 20 passing through an annular conduit (shown in part) along the length of the machine so as to then re-join the primary flow at the outlet of the turbine. The secondary flow can be accelerated so as to generate a reaction. The primary flow 18 and secondary flow 20 are annular flows and are channeled by the casing of the turbomachine. For this purpose, the casing has cylindrical walls or shrouds, which can be internal and external.

The turbomachine can comprise a compressor or a compressor portion in which the flow circulates radially. The turbomachine 2 can also comprise a similar turbine. The blades, in particular the leading edges thereof and/or the trailing edges thereof, can extend radially or axially.

Figure 2:
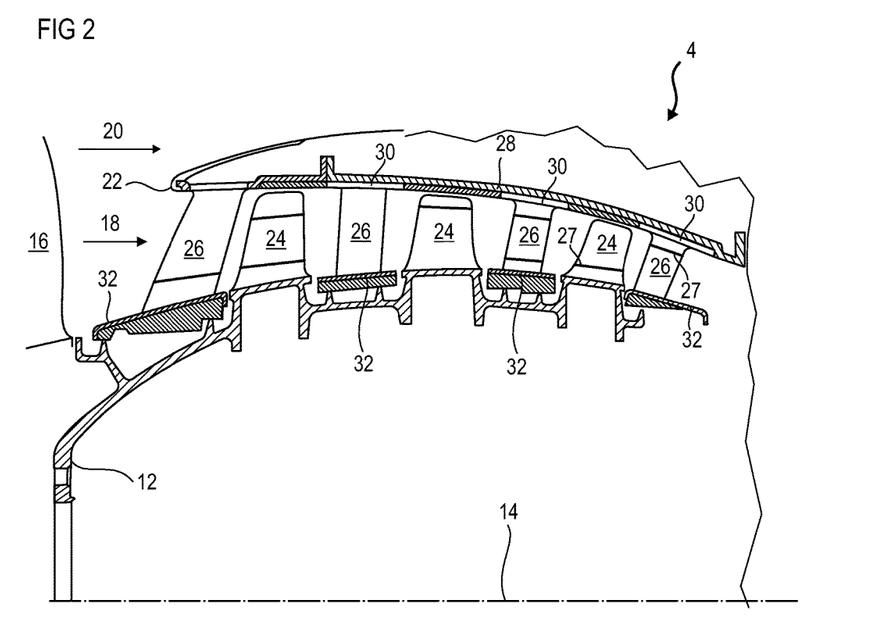
FIG. 2 shows a diagram of a turbomachine compressor according to various embodiments of the invention.

FIG. 2 is a sectional view of an axial-flow turbomachine compressor 2 such as that in FIG. 1. The compressor can be a low-pressure compressor 4. Here, part of the fan 16 and the separation beak 22 of the primary flow 18 and the secondary flow 20 can be seen. The rotor 12 comprises a number of rows of rotor blades 24, in the present case three.

The low-pressure compressor 4 can comprise a plurality of rectifiers, in the present case four, which each contain a row of stator blades 26. The rectifiers are associated with the fan 16 or with a row of rotor blades in order to rectify the flow of air so as to convert the speed of the flow into pressure.

The stator blades 26 extend essentially over the height thereof through the flow 18, e.g., radially, from an outer casing 28 and can be fixed there with the aid of a pin, e.g., formed on a fixing platform.

The blades (24, 26) can be fixed individually to the stator or to the rotor 12, or can be grouped into bladings comprising a plurality of blades forming a row over the circumference. The blades (24, 26) can be grouped into bladed casings, with a plurality of blades and a shroud, or with two concentric shrouds (30, 32) between which the blades (24, 26) extend radially.

A blading can be monoblock, e.g., it can be formed in one piece, e.g., via an additive manufacturing process. It can also be formed by soldering branches and airfoils to one another.

The rotor blades 24 and/or the stator blades 26 of the compressor can be branched. The branch designs can vary from one blade row to the other and can be branched at the blade foot and/or blade head. The joints 27 between the branches and the blade airfoils are visible.

Figure 3:
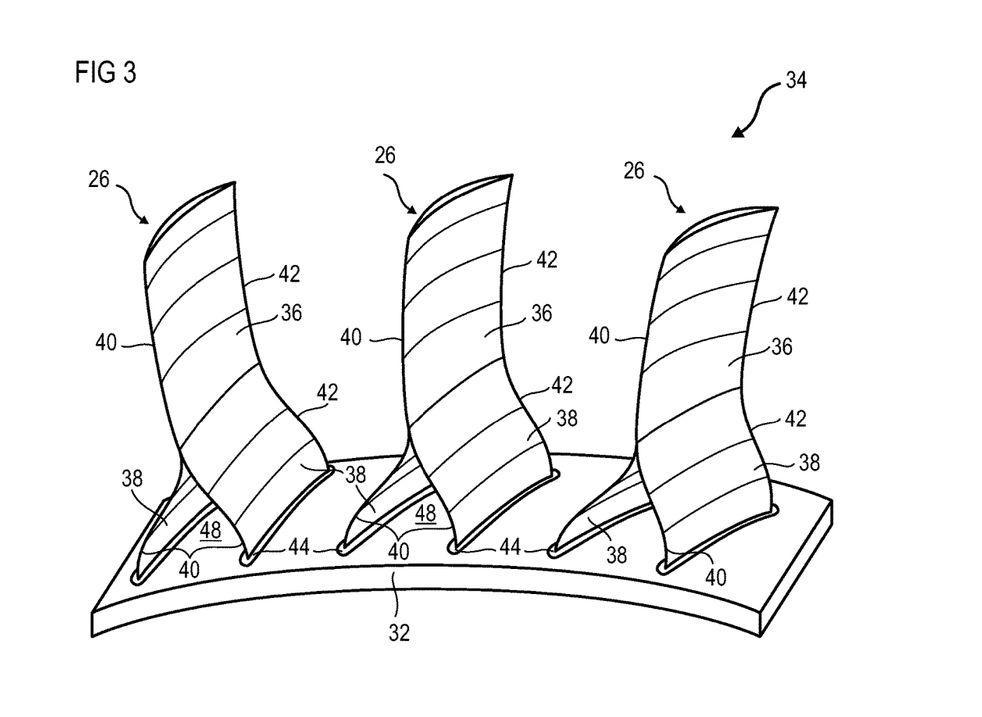
FIG. 3 illustrates a blading in accordance with various embodiments of the invention.

FIG. 3 shows a turbomachine blading 34 in accordance with various embodiments of the invention. The blading 34 shown is a stator blading, but could also be a rotor blading.

A blading 34 can be understood to be a surface, e.g., a rigid surface, making it possible to guide a flow of fluid. It can be understood to be a set of blades 26. The blading can be and/or can comprise a row of blades, with a plurality of blades 26, forming a portion of an annular row. The blades 26 are disposed on a wall, such as a shroud or a shroud portion, e.g., an inner shroud portion 32. The wall, or shroud portion can have the shape of a circle or arc of a circle.

Each blade 26 can protrude, e.g., extend radially, from the shroud 32. Each blade 26 comprises an airfoil 36 and branches 38 or branching. The airfoil 36 can be a joining airfoil 36 combining the branches 38, the branches can be branch airfoils 38. The branches 38 of the same blade are spaced from one another in the circumferential direction.

Each airfoil 36 and/or each branch 38 can have a general leaf shape, which can generally extend in a primary plane, the leaf can be substantially curved and/or having a variable thickness. An airfoil has a leading edge 40 and a trailing edge 42, which delimit an intrados surface and an extrados surface.

The branches 38 can be lateral branches 38 in the sense that they are laterally spaced from the airfoil 36 in the direction of thickness thereof and/or perpendicularly to the chord of the airfoil 36. Each branch 38 has two opposite ends in the direction of height, e.g., the radial height, of the airfoil. One of the ends is joined to the airfoil 36 and the other is joined to the shroud 32, which forms a support. The shroud 32 and the blades can be formed integrally, or the shroud can comprise openings 44 in which the ends of the branches are fixed and/or sealed.

The shroud 32 can be a portion of an outer casing, or a rotor wall, such as a rotor drum wall. The shroud can form a circle or an angular portion of a circle, such as an arched material strip.

The height of a branch 38, of an airfoil 36, or of the blade 26 can be perpendicular to the leading edge and/or the trailing edge of the airfoil, and/or can be oriented perpendicularly to the fluid. The airfoil and the branches are intended to extend in the flow of the turbomachine.

The branches 38 of adjacent blades 26 are distanced from one another and allow a passage between the blades along the extrados surface of the shroud 32. In combination with the shroud, the branches of at least one or each blade form a conduit 48, which passes through the blade 26. This conduit 48 is configured to support a flow of the turbomachine. The upper ends of the airfoils are free and form edges.

Figure 4:
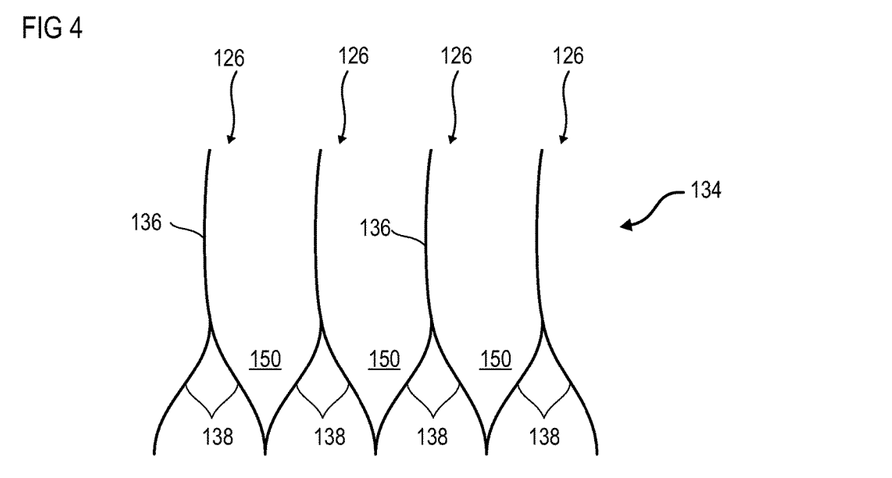
FIG. 4 illustrates a blading in accordance with various other embodiments of the invention.

FIG. 4 shows a blading 134 in accordance with various other embodiments of the invention. This FIG. 4 adopts the numbering of the previous figures for identical or similar elements, however the numbering is incremented by 100. The figure shows a row of blades 126, in various instances it can include a shroud. Each blade 126 is shown in the form of a curve, which can correspond to a leading edge and/or to a trailing edge and/or to a stacking curve of aerodynamic profiles of an airfoil or branch.

The row comprises a plurality of blades 126, each with branches 138 at the same end or on a same side of the airfoil 136. The branches 138 extend over the circumference in the direction of the adjacent blade 126, and in particular of the branches 138 of the adjacent blades. The adjacent branches 138 of two adjacent blades 126 are joined, for example at a radial end of the blade, such as the end opposite the end receiving the airfoil. Thus, the blades 126 form a chain of blades, with continuation of circumferential material, which are connected to one another with the aid of their branches 138.

The term joined can mean that the branches 138 or the branch airfoils 138 comprise joining edges or coincident edges. At the joining point of the branches, the total thickness can be less than the addition of the thicknesses of each branch.

At least two adjacent branches or each pair of adjacent branches 138 of adjacent blades 126 can form therebetween a channel 150. A channel 150 can be understood to mean an elongate depression, such as a passage delimited laterally between two opposite branch walls.

Figure 5:
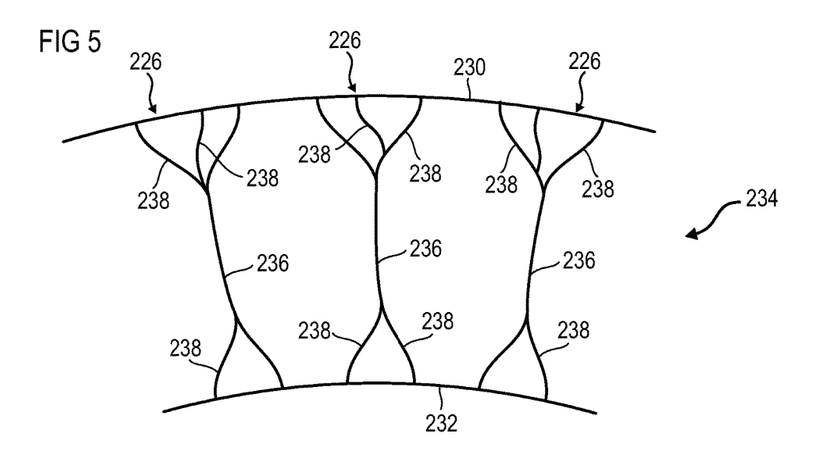
FIG. 5 illustrates a blading in accordance with yet other embodiments of the invention.

FIG. 5 shows a blading 234 in accordance with yet other embodiments of the invention. This FIG. 5 adopts the numbering of the previous figures for identical or similar elements, however the numbering is incremented by 200.

The blading 234 comprises a row of blades 226 with a plurality of blades forming an angular portion of an annular row. The row can form a circle. The blades 226 are disposed on a wall, such as a shroud (230, 232) or a shroud portion. The wall or shroud portion can have the shape of a circle or arc of a circle.

The blading can be a bladed casing. It can comprise at least three blades 226 each with an airfoil and branches extending the airfoil in the direction of the radial height of the airfoil. The airfoils, including the branches thereof, can be distanced from one another.

The blading 234 comprises two shroud segments, such as an inner shroud segment 232 and an outer shroud segment 230, which can be understood to be angular sectors of tubes. The segments are concentric and define a fluid stream of which the middle in the radial height direction is located in line with the airfoil, e.g., at mid-height.

At least one or each blade 226 can comprise two sets of branches 238, which are each joined to one end of the airfoil 236 and to a shroud segment (230, 232). The shroud segments are thus connected to one another via, in this order, first sets of branches 238, airfoils 236, and second sets of branches 238. Each branch is joined to the blade and/or to a shroud over the majority, e.g., over the entire length thereof.

The sets of branches 238 of at least one blade or each blade can have different numbers of branches. The sets having most branches 238 can be arranged on the same side of the airfoil 236. The arrangements of branches can vary from one set to another adjacent set.

For example, one set can comprise at least three branches, of which two branches 238 are side branches over the circumference, between which at least one central branch 238 is disposed. These branches 238 can all be joined by each having a joining edge; the edges being coincident. At least one or each blade 226 can have branches 238 that are joined to the airfoil 236 at different heights. A branch 238 can extend from another branch 238 remaining at a distance from another branch and/or from the airfoil 236. A branch 238 of this type can form a strut that makes the blading 234 rigid. A branch 238 can extend laterally from one side of the airfoil 236, then from the other, or can extend only from one side of the airfoil 236.

Figure 6:
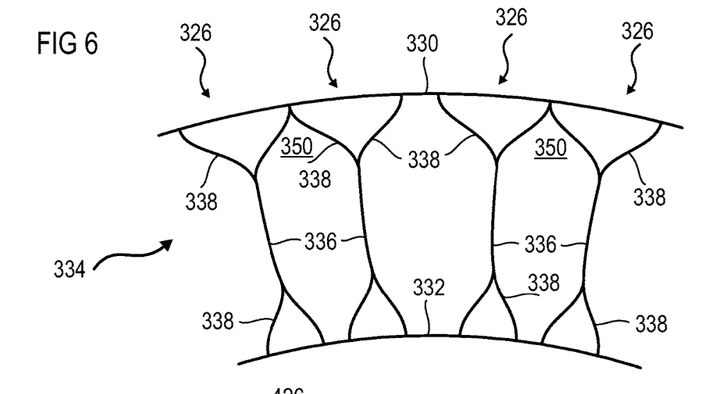
FIG. 6 illustrates a blading in accordance with still other embodiments of the invention.

FIG. 6 shows a blading 334 in accordance with still other embodiments of the invention. This FIG. 6 adopts the numbering of the previous figures for identical or similar elements, however the numbering is incremented by 300. The blading shown is a stator blading, but alternatively could be associated with the rotor.

The blading 334 has a plurality of sets of blades. Each set can form an angular portion of an annular row of blades. Each set of blades has a plurality of blades 326, each with an airfoil 336 and branches 338 extending the airfoil 336 in the direction of height thereof, e.g., in the direction of radial height thereof. Each blade 326 can have two sets of branches. Adjacent branches 338 of a set of blades 326 can be joined on a radial side, the branches 338 remaining at a distance on the other side. The sets of blades can be distanced from one another. In particular, the branches of a set of blades can be distanced, over the circumference, from each branch 338 of an adjacent set of blades.

Figure 7:
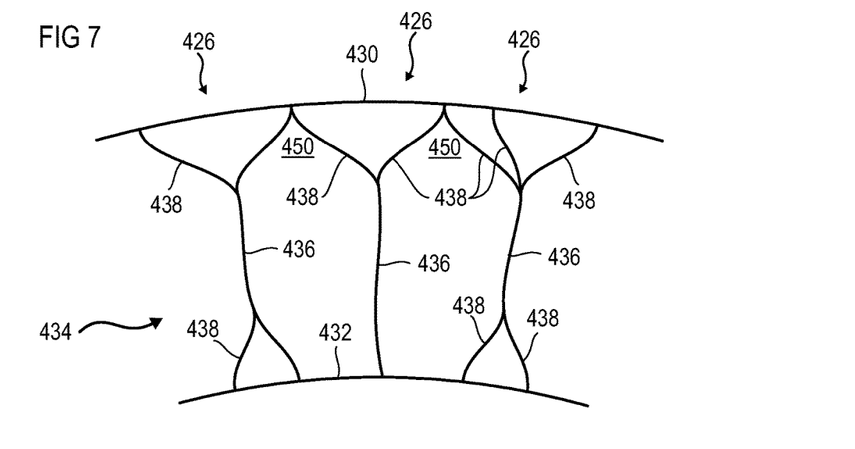
FIG. 7 illustrates a blading in accordance with a still yet other embodiments of the invention.

FIG. 7 shows a blading 434 in accordance with still yet other embodiments of the invention. This FIG. 7 adopts the numbering of the previous figures for identical or similar elements, however the numbering is incremented by 400. Specific numbers are used for the elements specific to this embodiment.

The blading 434 comprises a row of blades 426 forming at least one portion of an annular turbomachine row. The blades 426 are disposed on a wall, such as a shroud or a shroud portion (430, 432). The wall or shroud portion can have the shape of a circle or an arc of a circle.

The row can have a mixed arrangement of blades 426. Some blades 426 can be free from branches at least at one end or at each end. The number of branches 438 on the same radial side of the blading can vary between the blades 426. Some or all the adjacent branches 438 of different blades 426 can be joined. On one radial side of the blading, the branches can form a row and/or can be joined to one another so as to form a chain of branches 438, which can also be joined to a shroud 430 in addition to associated airfoils 436. This double joining of the branches makes the shroud rigid and the arts makes the blading rigid with respect to torsional forces.

Figure 8:
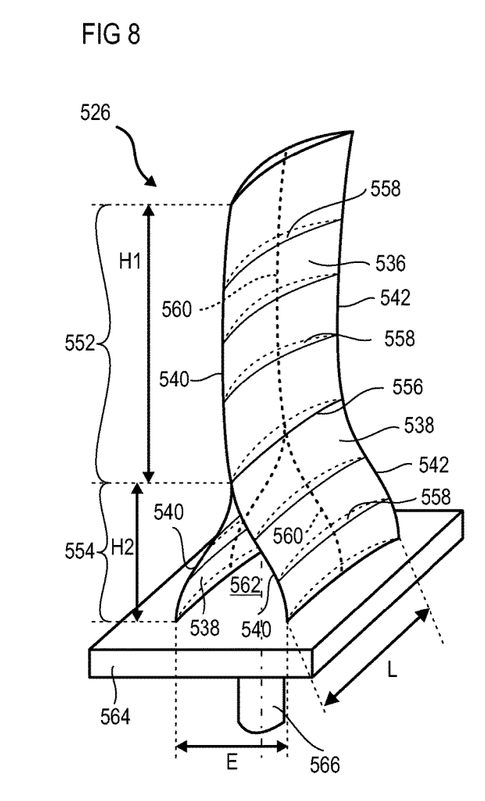
FIG. 8 illustrates a blade in accordance with various other embodiments of the invention.

FIG. 8 shows a blade 526 in accordance with various other embodiments of the invention. This FIG. 8 adopts the numbering of the previous figures for identical or similar elements, however the numbering is incremented by 500. Specific numbers are used for elements specific to this embodiment. The blade 526 can be a stator blade 526 as shown in FIG. 2.

The blade 526 comprises an airfoil 536 and at least two branches 538, e.g., three or more branches 538. The airfoil 536 can be a joining airfoil 536 or a main airfoil 536 in the sense that the height and/or thickness thereof is greater than that of each branch 538. The joining airfoil 536 forms a joining portion 552, and the branches 538 form a branch portion 554, the portions being superimposed in the height direction.

The branches 538 can be branch airfoils 538 that are joined by the joining airfoil 536. For this purpose they can comprise joining edges that are at least partially, e.g., completely coincident along the chord of the joining airfoil. The joining edges 556 can form ends or delimitations of the branch airfoils 538. The joining airfoil 536 and the branch airfoils 538 are intended each to be disposed in the flow of the turbomachine.

The joining airfoil 536 is disposed in the extension of the branch airfoils 538 at the joining point therebetween. The joining airfoil 536 can form the joining point between the branch airfoils 538. These can form divisions of the joining airfoil. They can form legs 538 separating from the joining airfoil at a branching point. The joining airfoil 536 can divide or separate into branch airfoils. The branches can be anchored to one another and/or on one another.

The joining airfoil 536 and/or each branch airfoil 538 can comprise a leading edge 540 and a trailing edge 542. The joining airfoil and/or each branch airfoil can comprise an intrados surface and an extrados surface extending from the leading edge 540 to the corresponding trailing edge 542. The intrados surface and the extrados surface of the joining airfoil are tangential, e.g., along the entire length of the chord of the airfoil, to the adjacent surfaces of the branch airfoils 538.

The joining airfoil 536 and/or each branch airfoil 538 can comprise aerodynamic profiles 558, which are in some instances cambered and which are stacked in the height direction, e.g., in the radial height direction. The centers of gravity of the aerodynamic profiles 558 of the joining airfoil 536 and/or of each branch airfoil 538 can describe a stacking curve 560. The stacking curves 560 of the branch airfoils 538 can be in the radial and/or axial and/or circumferential extension of the stacking curve 560 of the joining airfoil 536, in some instances becoming progressively offset in relation thereto. The branch airfoils can define a channel 562 therebetween, in some instances at a distance from the joining airfoil 536. The height H1 of the joining airfoil 536 can be greater than or equal to the height H2 of each branch airfoil 538.

The leading edges 540 and/or the trailing edges 542 and/or the stacking curves 560 of each branch airfoil 538 can have a variation, e.g., an increase, and/or an inversion of curvature in relation to, respectively, the leading edge 540 and/or the trailing edge 542 and/or the stacking curve 560 of the joining airfoil 536.

The maximum thickness of the aerodynamic profiles 558 of the joining airfoil 536 can be greater than the maximum thickness of the aerodynamic profiles 558 of each branch airfoil 538. The surface area of each aerodynamic profile 558 of the joining airfoil can be greater than or equal to the surface area of each aerodynamic profile of at least one or each branch. The addition of the surface areas of the aerodynamic profiles of the branches at a given height can be greater than or equal to the surface area of each aerodynamic profile of the airfoil.

The blade 526 has at least two branch airfoils 538, e.g., three or four, or even more at one end. The blade 526 can comprise a support 564 joined to the branch airfoils. The support 564 can be a fixing platform 564, for example equipped with a fixing pin 566. The branch airfoils 538, the joining airfoil 536, and in some instances the support 562 can be integral. They can be provided by additive manufacturing with a titanium powder.

At least one or each branch airfoil 538 can comprise parts, over the height of the blade, that are inclined in relation to one another. These parts can be curves and can have variations or inversions of curvature. Along the height, the mean axis of the stacking curve 560 of at least one or each branch airfoil 538 is inclined in relation to that of the joining airfoil 536. These geometries can be observed at the leading edge 540 and/or the trailing edge 542 and/or the stacking curve 560 of the profiles 558.

The distance E between the branch airfoils 538, measured opposite the joining airfoil 536 at the leading edges 540 thereof or at the trailing edges 542 thereof or at the maximum passage width, is greater than the majority of the mean or maximum thickness of the joining airfoil 536. The distance E can be less than the length L of the branch airfoils 538 and/or less than the height H2 of the branch airfoils. For at least one or each branch airfoil 538, the length L can be greater than or equal to the height H2.

Figure 9:
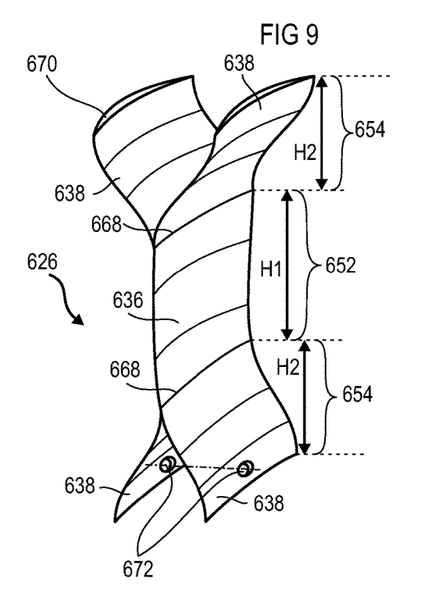
FIG. 9 illustrates a blade in accordance with still yet other embodiments of the invention.

FIG. 9 shows a blade 626 in accordance with still yet other embodiments of the invention. This FIG. 9 adopts the numbering of the previous figures for identical or similar elements, however the numbering is incremented by 600. Specific numbers are used for the elements specific to this embodiment.

The blade 626 comprises two branched portions 654 joined by a joining portion 652. The joining airfoil 636 of the blade 626 comprise two ends 668 that are opposite over the height of the joining airfoil, for example radial ends, such as a head and a foot. The joining airfoil 636 can comprise branch airfoils 638 at each of the radial ends thereof, the branch airfoils forming a first set and a second set of branch airfoils 638, each set being joined to one of the ends 668 of the joining airfoil 636. The height H2 of the branch airfoils can vary from one set to another and can remain less than the height H1 of the joining airfoil 636.

The ends of branch airfoils can be free edges 670. They can form edges in the form of cambered aerodynamic blade profiles. The ends can have fixing means, such as fixing pins. The ends at the same end of a blade can each comprise a fixing orifice 672, the orifices 672 can be aligned along the row formed by the associated branch airfoils.

Figure 10:
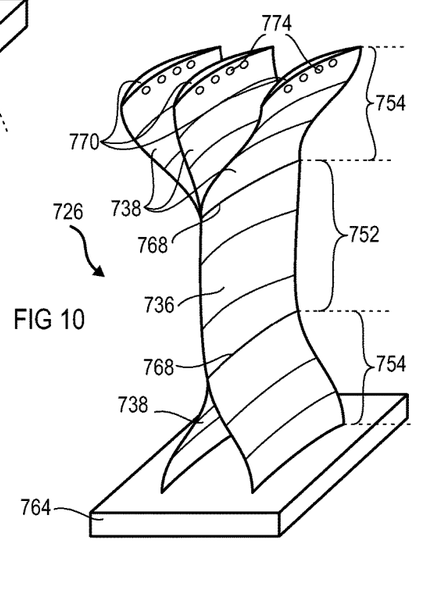
FIG. 10 illustrates a blade in accordance with yet still other embodiments of the invention.

FIG. 10 shows a blade 726 in accordance with yet still other embodiments of the invention. This FIG. 10 adopts the numbering of the previous figures for identical or similar elements, however the numbering is incremented by 700. Specific numbers are used for the elements specific to this embodiment.

The blade 726 comprises a joining airfoil 736 with two ends 768 that are opposite in the height direction H1, each end 768 comprising branches 738 extending the airfoil in the height direction. Branches form a first set of branches at one end 768 of the airfoil 736, and a second set of branches 738 at the other end 768. The opposite ends 768 comprise a different number of branches 738.

The sets of branches can be superimposed in the height direction of the blade 726 whilst being separated by the airfoil 736. One of the sets can cover the other set, the covering can be over the mean chord of the airfoil and/or over the thickness of the airfoil.

One set of branches can be connected to a support 764, such as a fixing platform 764. The set of branches on the side opposite the support 764 can have free edges 770, and in some instances a fixing means 774, such as bosses 774 or bumps 774. These means can be used to seal the branches to a wall, to a support, or to a shroud.

The various embodiments of blades illustrated and described with regard to FIGS. 3 and 7 can be formed in accordance with the various embodiments illustrated and described with regard to FIGS. 8, 9 and/or 10. A blading can comprise branches at each end over the height of the airfoils. The number of branches can be different at each of these ends. The various embodiments of the blades illustrated and described with regard to FIGS. 9 and 10 can adopt the configurations of the blade illustrated and described with regard to FIG. 8, in particular with regard to the arrangement of the leading edges, the trailing edges, the joining edges, the stacking curves, and the arrangement of the branch airfoils in relation to the joining airfoil.

What is claimed is:

1. A blade of a turbomachine, said blade comprising:
   a joining airfoil intended to extend along a height H1 through a flow of the turbomachine; and
   at least two branch airfoils, which are connected to the joining airfoil, which support a flow between them, which have an aerodynamic profile comprising a tapered trailing edge, and which extend the joining airfoil along the height H1 thereof,
   wherein each of the branch airfoils comprises a joining edge joined to the joining airfoil, the joining edges of the branch airfoils being coincident so as to join the branch airfoils to one another along the joining airfoil,
   and the joining airfoil and the branch airfoils comprise trailing edges, the trailing edge of the joining airfoil being extended by the trailing edges of the branch airfoils;
   and the blade further comprising a support connected to the branch airfoils on the side opposite the joining airfoil.

2. The blade in accordance with claim 1, wherein the support is a fixing platform and comprises a fixing portion.

3. The blade in accordance with claim 1, wherein each of the joining airfoil and branch airfoils comprise leading edges, the leading edge of the joining airfoil being extended along the joining airfoil's height H1 by the leading edges of the branch airfoils.

4. The blade in accordance with claim 1, wherein each of the joining airfoil and branch airfoils comprise leading edges and trailing edges, the leading edges and the trailing edges of the branch airfoils being tangential to the leading edge and the trailing edge of the joining airfoil respectively, such that the branch airfoils each touch both the leading edge and the trailing edge of the joining airfoil.

5. The blade in accordance with claim 1, wherein the branch airfoils form a thickened portion in the blade compared with the joining airfoil, each of the joining airfoil and branch airfoils comprising an intrados surface and an extrados surface, the joining edges being delimited by the intrados surface and by the extrados surface of the joining airfoil.

6. The blade in accordance with claim 1, wherein each of the joining airfoil and branch airfoils comprises a radial stack of aerodynamic profiles, the stacks of profiles of the branch airfoils diverging from the stack of profiles of the joining airfoil such that at least one profile of a branch airfoil is away from at least one profile of the joining airfoil measured in the plane of the profile of the joining airfoil.

7. The blade in accordance with claim 1, wherein each of the joining airfoil and branch airfoils comprise aerodynamic profiles, the mean thickness of the aerodynamic profiles of the branch airfoils is less than the mean thickness of the profiles of the joining airfoil.

8. The blade in accordance with claim 1, wherein the branch airfoils delimit, therebetween, a space passing through the blade along the chord of the joining airfoil, the space mainly extending along the chord of the joining airfoil.

9. The blade in accordance with claim 1, wherein each of the joining airfoil and branch airfoils comprises an intrados surface and an extrados surface, the intrados surface and the extrados surface of the joining airfoil being tangential to the intrados surface of one of the branch airfoils, and being tangential to the extrados surface of another branch airfoil.

10. The blade in accordance with claim 1, wherein the at least two branch airfoils comprise faces facing one another, the at least two branch airfoils forming a circumferential row portion.

11. The blade in accordance with claim 1, wherein at least one branch airfoil is inclined relative to the joining airfoil.

12. The blade in accordance with claim 1, wherein at least one branch airfoil exhibits an inversion of curvature in relation to the joining airfoil.

13. The blade in accordance with claim 1, wherein the branch airfoils comprise aerodynamic profiles cambered in the same direction, the profiles having spacings that are generally constant along the joining airfoil so as to support the flow in the turbomachine.

14. The blade in accordance with claim 1, wherein the branch airfoils generally have parallel chords at least at one given height so as to guide the flow between them.

15. A blade of a turbomachine, said blade comprising:
    a joining airfoil intended to align along a height H1 across a flow of the turbomachine; and
    at least two branch airfoils, which are connected to the joining airfoil, which support a flow between them, which have an aerodynamic profile comprising a tapered trailing edge, and which extend the joining airfoil along the height H1 thereof, the joining airfoil and the branch airfoils forming a one-piece structure,
    wherein the at least two branch airfoils comprise joining edges at least partially coincident so as to join the branch airfoils to one another along the joining airfoil,
    and the joining airfoil and the branch airfoils comprise trailing edges, the trailing edge of the joining airfoil being extended by the trailing edges of the branch airfoils;
    and the blade further comprising a support connected to the branch airfoils on the side opposite the joining airfoil.

16. The blade in accordance with claim 15, wherein the branch airfoils and the joining airfoil forming an integral structure and are made by additive manufacturing.

17. A turbomachine, said turbomachine comprising:
    a plurality of annular rows of blades, at least one of the blades comprising:
    a joining airfoil extending along a height H1 through a flow of the turbomachine, the joining airfoil comprising a joining edge and a tapered trailing edge, and
    the at least one of the blades further comprising at least two branch airfoils, which are connected to the joining edge of the joining airfoil, and extend the joining airfoil along the height H1 thereof, the at least two branch airfoils supporting a flow between them and comprising:
    joining edges in contact with each other and at least partially coincident so as to join the branch airfoils to one another along the joining airfoil, and the joining edges of the branch airfoils are joined to each other over the majority of the joining edge of the joining airfoil, the at least two branch airfoils comprising aerodynamic profiles wherein a pressure side and a suction side of each branch airfoil intersect in a point at the trailing edges that touch the tapered trailing edge of the joining airfoil.

18. The turbomachine in accordance with claim 17, wherein the joining edges of the branch airfoils are joined all of their length and all of the length of the chord of the joining edge of the joining airfoil.

* * * * *